United States Patent [19]

Ejiri

[11] Patent Number: 4,945,352

[45] Date of Patent: Jul. 31, 1990

[54] ACTIVE MATRIX DISPLAY DEVICE OF THE NONLINEAR TWO-TERMINAL TYPE

[75] Inventor: Akira Ejiri, Tokyo, Japan

[73] Assignee: Seiko Instruments Inc., Japan

[21] Appl. No.: 157,045

[22] Filed: Feb. 16, 1988

[30] Foreign Application Priority Data

Feb. 13, 1987 [JP] Japan .................................. 62-30811

[51] Int. Cl.⁵ .................................................. G09G 3/18
[52] U.S. Cl. .................................. 340/805; 340/784; 350/330
[58] Field of Search ............... 340/719, 784, 805, 811, 340/781, 785; 350/33

[56] References Cited

U.S. PATENT DOCUMENTS

| | | | |
|---|---|---|---|
| 3,896,430 | 7/1975 | Hatsukano | 340/811 |
| 3,903,518 | 9/1975 | Hatsukano | 340/784 |
| 4,506,955 | 3/1985 | Kmetz | 340/784 |
| 4,613,854 | 9/1986 | Holz et al. | 340/805 |
| 4,638,310 | 1/1987 | Ayliffe | 340/784 |
| 4,702,560 | 10/1987 | Endo et al. | 340/784 |
| 4,703,305 | 10/1987 | Ayliffe | 340/805 |
| 4,710,768 | 12/1987 | Takeda et al. | 340/805 |
| 4,845,482 | 7/1989 | Howard et al. | 340/984 |

Primary Examiner—David K. Moore
Assistant Examiner—M. Fatahiyar
Attorney, Agent, or Firm—Bruce L. Adams; Van C. Wilks

[57] ABSTRACT

A nonlinear, two-terminal type, active matrix display device has a liquid crystal material sandwiched between intersecting row and column electrodes to define a matrix of picture elements. To avoid crosstalk, a non-selecting signal applied to a row electrode picture element is made equal in phase and amplitude to a signal fed to the opposed column electrode in order to reduce the effective voltage applied to the picture element during each non-selecting period to near zero.

9 Claims, 8 Drawing Sheets

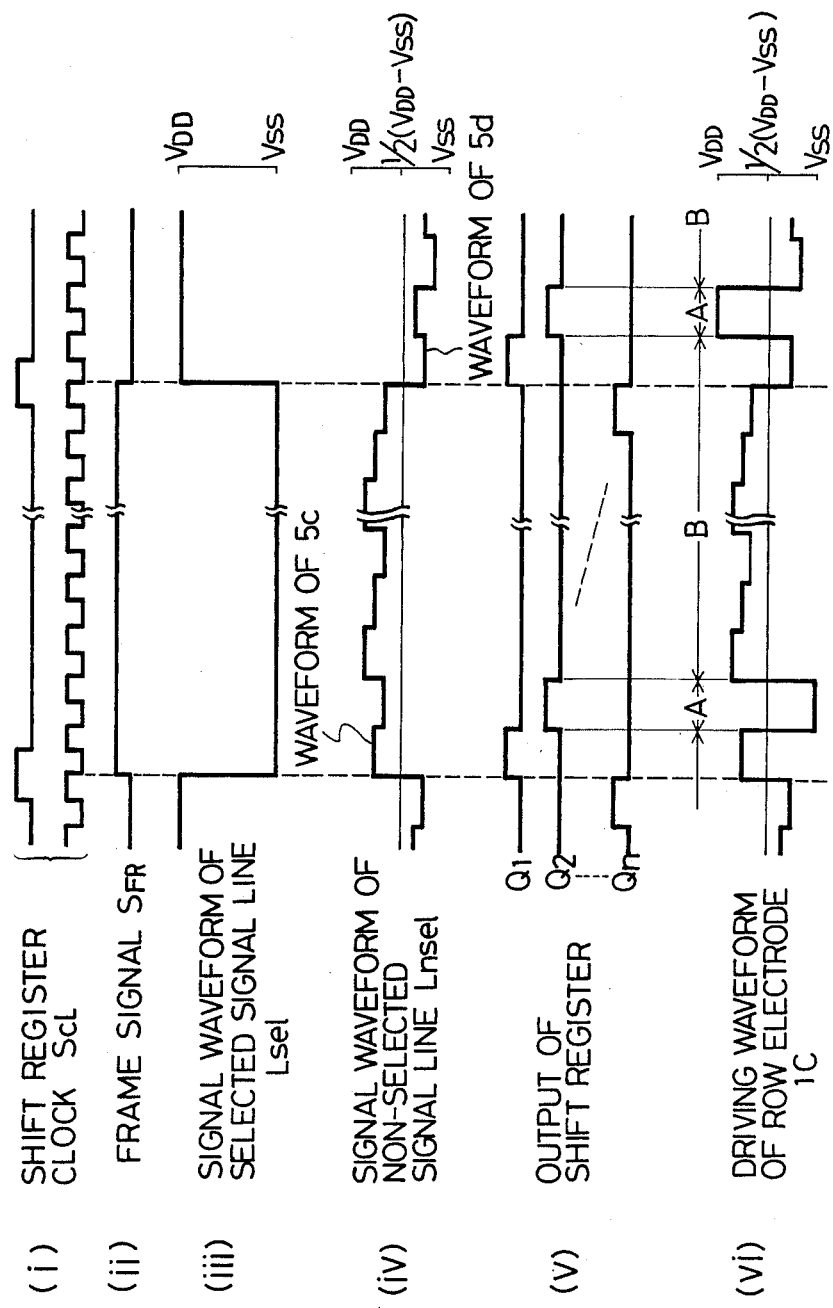

ACTIVE MATRIX DISPLAY DEVICE OF THE NONLINEAR TWO-TERMINAL TYPE

BACKGROUND OF THE INVENTION

1. (Field of the invention)

The present invention relates to a liquid-crystal display and, more particularly, to an active matrix display device using nonlinear devices each having two terminals.

2. (Prior arts)

When a large amount of information is displayed on a liquid-crystal display at a high density, the display is driven by the SBE method, the ferroelectric method, the active matrix method, or other method. In the active matrix method, either transistors or nonlinear two-terminal devices are formed as switches on a panel. In either case, voltage of a display signal is stored on each picture element active matrix. The method permits a large amount of information to be displayed with high image quality. Where, though, nonlinear, two-terminal devices are used as the switches, it is easier to fabricate a panel on which a large amount of information can be displayed at a high density, compared to using transistors, but it has been difficult to obtain high image quality. Two methods are available for driving an active matrix display device using such nonlinear, two-terminal devices as switches. One of them uses pulse-duration modulation, and is generally used to display gradation on a simple matrix display device. The other uses amplitude modulation that is employed to drive a panel where transistors are used as switches. Both of these methods for driving an active matrix display device using such nonlinear, two-terminal devices as switches are described below by referring to FIGS. 2 and 3.

FIG. 2(a) is a block diagram of a circuit for driving a display device by pulse-duration modulation. FIG. 2(b) is a block diagram of a column driver 8. FIG. 2(c) is a block diagram of a row driver 3. FIG. 2(d) is a waveform diagram of the voltage applied between row and column electrodes. The display device comprises an active matrix panel 1 of the nonlinear, two-terminal type, a row driver 3, a column driver 8, an analog-to-digital converter circuit 6, and a voltage source 7 for driving the liquid-crystal display.

The matrix panel 1 has row electrodes 1c, column electrodes 1d, and picture elements 10 arranged between the electrodes 1c and 1d. The picture elements 10 are arranged in rows and columns. Each picture element 10 consists of a nonlinear, two-terminal device 1a and a liquid-crystal layer 1b which are connected in series. Note that only one of the elements 10 is schematically shown. Normally, the panel is energized with 1 V, and the matrix is composed of 240 to 480 row electrodes k and 320 column electrodes 1d, for example. When color display is made, 320 column electrodes are provided for each of the three primary colors red, green, and blue. In that case, the number of picture elements would be 76,800 to 460,800.

As shown in FIG. 2(b), the column driver 8 for driving the column electrodes 1d comprises shift registers 8a, 4-bit latches 8b and 8c, a 4-bit coincidence circuit 8d, and a waveform synthesizer circuit 8e.

During the operation of the circuit, built as described above, an analog video signal is converted into digital form by the A/D converter circuit 6 and fed to the column driver 8. A timing signal is applied to one of the shift registers 8a of the driver 8 so that it may be clocked. The digital signal is stored in the corresponding 4-bit latch 8b. After data corresponding to about one line of information is stored in it, the data is transferred to another 4-bit latch 8c. Then, the coincidence circuit 8d compares the data held in the latch 8c with a 4-bit reference signal. The output signal is furnished to the waveform synthesizer circuit 8e that controls the time for which a selecting or non-selecting potential is applied to the column electrode 1d. In this case, the gradation is controlled with four bits and, therefore, $2^4=16$ selecting periods are possible. The selecting and non-selecting potentials are supplied from the voltage source 7 as constant voltages of $V_0$, $V_1$, $V_4$, and $V_5$. In order to drive the liquid-crystal display with alternating current, the waveform synthesizer circuit 8e switches the selecting potential to the non-selecting potential, or vice versa on every frame.

As shown in FIG. 2(c), the row driver for driving the row electrodes 1c comprises a shift register 3a and a waveform synthesizer circuit 3b. The output signal from the driver 3 is either a row-selecting signal or a row non-selecting signal applied to the row electrodes 1c. Their potentials are supplied from the voltage source 7 as $V_0$, $V_1$, $V_4$, $V_5$.

FIG. 2(d) shows the waveform of the voltage applied between one nonlinear two-terminal device 1a and the liquid-crystal layer 1b. This waveform is the difference between the output waveform from the column driver 8 and the output waveform from the row driver 3. Within a selecting period $t_s$, a selecting voltage $V_s$ is maintained during a selecting pulse duration $P_s$ that assumes any one of 16 values, depending on the digitized video signal as already described. When the selecting voltage $V_s$ is applied to one picture element 10, the nonlinear, two-terminal device 1a contained in it exhibits a low resistance, charging the equivalent capacitance of the liquid-crystal layer 1b. At this time, the amount of charging can vary among 16 different values according to changes in the selecting pulse duration $P_s$, whereby the gradation is controlled. During each non-selecting period $t_{ns}$, a voltage of $V_{ns}$ is applied to each picture element 10. Under this condition, the nonlinear device 1a shows a relatively high resistance. Hence, the liquid-crystal layer 1b which was charged during the previous selecting period is gradually discharged. In this way, the gradation is controlled by pulse-duration modulation. This technique is disclosed in Patent Laid-Open No. 14890/1983.

The manner in which the gradation is controlled by amplitude modulation is described next. FIG. 3(a) is a block diagram of a display device using the amplitude modulation method. FIG. 3(b) is a block diagram of the column driver 2 shown in FIG. 3(a). FIG. 3(c) is a block diagram of the row driver 3 shown in FIG. 3(a). FIG. 3(d) is a waveform diagram of the voltage applied to each picture element 10 shown in FIG. 3(a).

Referring to FIG. 3(b), the column driver 2 comprises a shift register 2a and a set of analog switches 2b which are opened and closed by the output from the register 2a. The output signal from the register 2a varies according to every timing signal. The outputs of the analog switches 2b are connected with their respective column electrodes 1d. A video signal that is applied to the analog switches 2b is fed to the column electrodes 1d successively as information about voltage, via the analog switches which operate according to the timing signal. Thus, the video signal is sampled, and the sampled amplitudes are held. Then, they are fed to the column electrodes. It follows that the information about the voltage of the video signal, which was sampled and held, is retained by the capacity equal to the sum of the picture elements 10 on the same column electrode. Referring to FIG. 3(a), the video signal is supplied to an amplifier 9a having a gain of 1 and also to an amplifier 9b having a gain of −1 to produce signals having different polarities, for driving the liquid crystal with alternating current. The amplifiers 9a and 9b are included in the video amplifier circuit 9. A multiplexer 4 alternately supplies the output signals from the amplifiers 9a and 9b to the column driver 2 on every frame.

The row driver 3 shown in FIG. 3(c) is similar in circuit configuration and operation to one using pulse-duration modulation and, therefore, it will not be described below.

FIG. 3(d) is a diagram of waveforms applied to the picture element 10 shown in FIG. 3(a). The waveform shown in (i) shows the voltage of the video signal which was sampled and held on the column electrode 1d.

The waveform shown in (ii) shows the voltage applied to the row electrode 1c. In this waveform, $P_{sel}$ is a row-selecting signal. During this period, some of the row electrodes are selected. The selected row electrodes inject electric charges to the picture elements, or charges are released from the picture elements. That is, data is written and erased. $P_{nsel}$ shows a non-selecting signal. During this period, electric charges are injected to no picture elements 10, nor are charges released from any picture element. The condition set by the selecting period is maintained.

The waveform shown in (iii) shows the voltage applied to the picture element 10, and this is equal to the voltage difference between the waveform (i) applied to one column electrode and the waveform (ii) applied to one row electrode. When voltage $V_{sel}$ is applied to the picture element 10, the resistance of the nonlinear, two-terminal device 1a included in the element 10 sufficiently decreases. Under this condition, charges are injected to or released from the equivalent capacitance of the liquid-crystal layer 1b. During the non-selecting period $t_{ns}$ in which voltage $V_{nsel}$ is applied to the picture element 10, the resistance of the nonlinear, two-terminal device 1a included in the element 10 increases sufficiently, and so the electric charges which were injected during $V_{sel}$ are retained in the equivalent capacitance of the liquid-crystal layer 1b. At this time, the gradation of the picture element 10 is controlled according to the value of the selecting voltage $V_{sel}$. The value of $V_{sel}$ depends on the voltage value of the video signal, which is sampled and held and applied to the column electrodes.

The aforementioned two driving methods have problems inherent in them.

In the pulse-duration method, it is possible to obtain somewhat high image quality, but this technique requires digital video data of more than 6 bits to permit an image to be reproduced in a natural way on a display device. To enable this, the number of drivers used per column electrode increases. As a result, the circuit for driving the column electrodes and the converter circuit for converting analog video signals becomes expensive.

When the amplitude modulation method is employed, the driving circuit is simplified, thus only a small number of elements are needed. Therefore, the cost is low. However, this method has the following disadvantages. As can be seen from the waveform (iii) of FIG. 3(d), the video signal which is sampled and held applies a signal having amplitude $V_{nsel}$ to one column electrode during each non-selecting period. This signal varies the resistance value of the nonlinear two-terminal device 1a of the picture element 10, causing shift of charges out of or into the equivalent capacitance of the liquid-crystal layer 1b. For this reason, the amount of charge which is written to or removed from the equivalent capacitance of the liquid-crystal layer 1b by the selecting voltage $V_{sel}$ for displaying purposes is also varied. As a result, one picture element is affected by the amplitude modulation of all other picture elements on the same column of electrodes, resulting in crosstalk along the column electrodes. Hence, sufficiently high contrast and image quality cannot be obtained.

SUMMARY OF THE INVENTION

The object of the present invention is to provide a nonlinear, two-terminal active matrix device which is made of relatively inexpensive circuitry and driven by amplitude modulation and which is free of the foregoing effects of column electrode voltages on picture elements during each non-selecting period, i.e., crosstalk.

BRIEF DESCRIPTION OF THE DRAWINGS

FIG. 1(d) is a time chart for illustrating the operation of the row driver 3;

DETAILED DESCRIPTION OF PREFERRED EMBODIMENTS

Figure 1A:
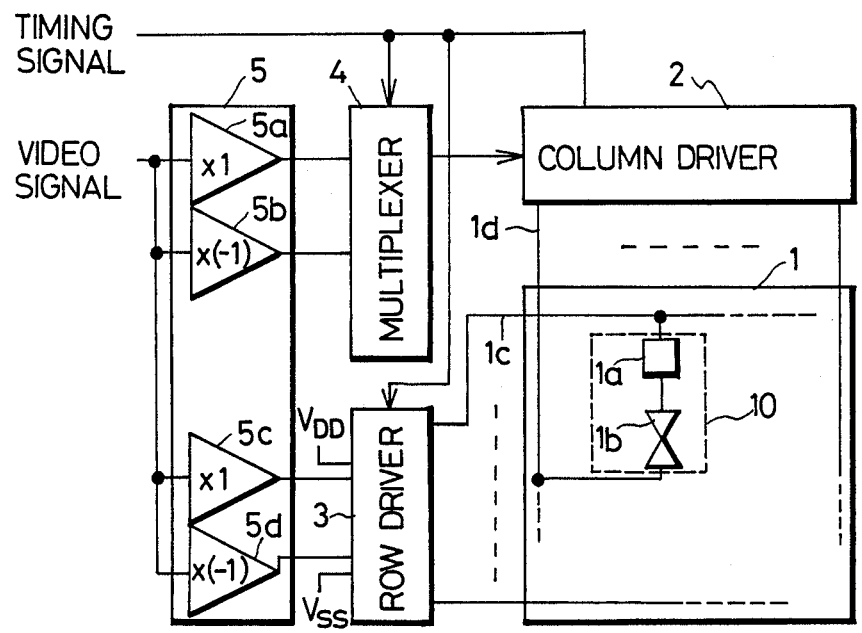
FIG. 1(a) is a block diagram of a nonlinear, two-terminal, active matrix display device according to the invention.
Figure 1B:
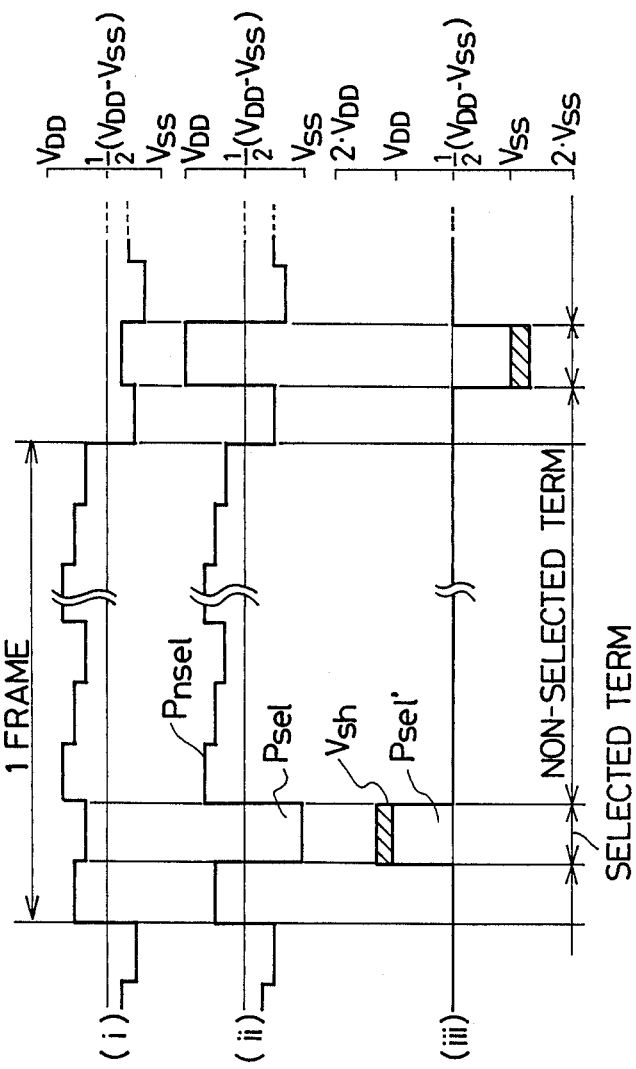
FIG. 1(b) is a diagram showing waveforms produced inside the display device shown in FIG. 1(a)
Figure 1C:
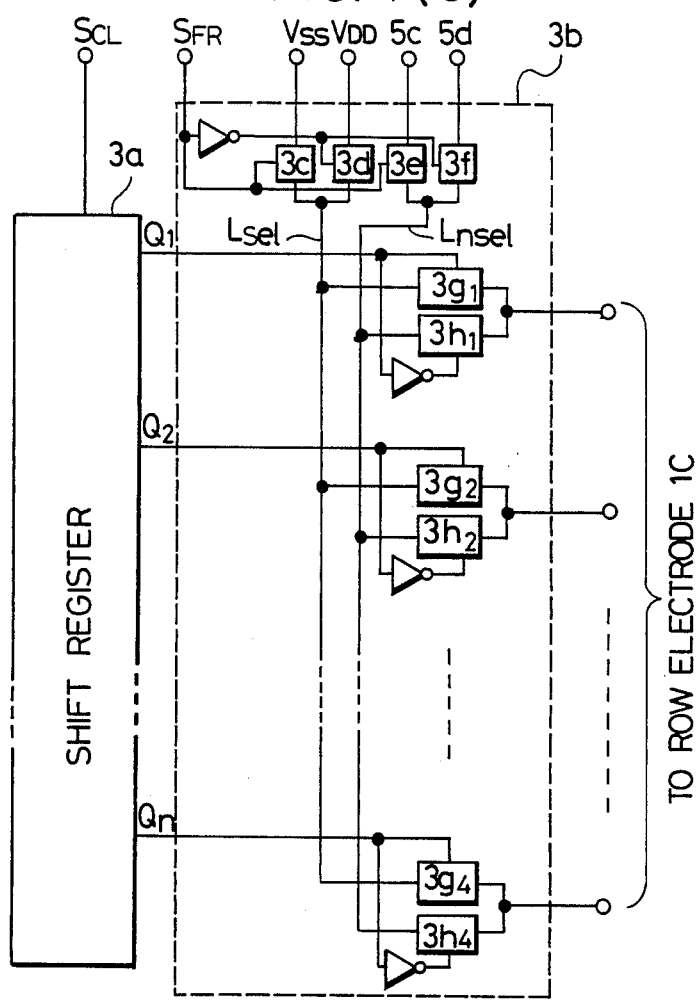
FIG. 1(c) is a circuit diagram of the row driver 3 shown in FIG. 1(a)
Figure 2A:
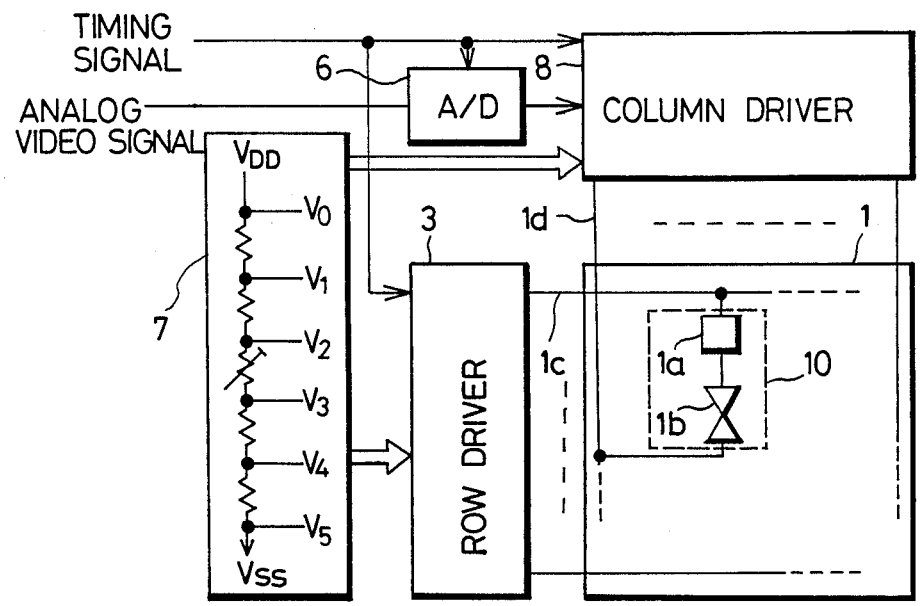
FIG. 2(a) is a block diagram of the driver circuit of a display device utilizing pulse-duration modulation.
Figure 2B:
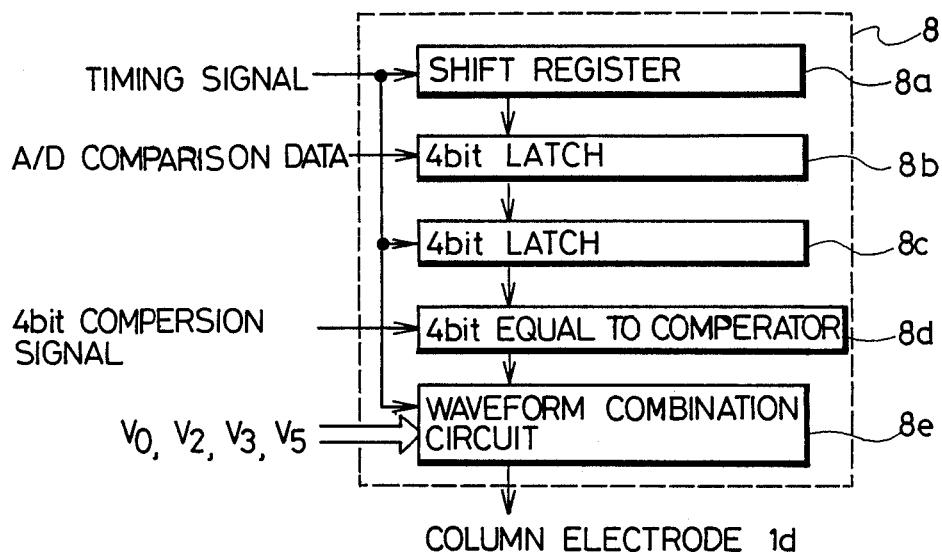
FIG. 2(b) is a block diagram of the column driver 8 shown in FIG. 2(a)
Figure 2C:
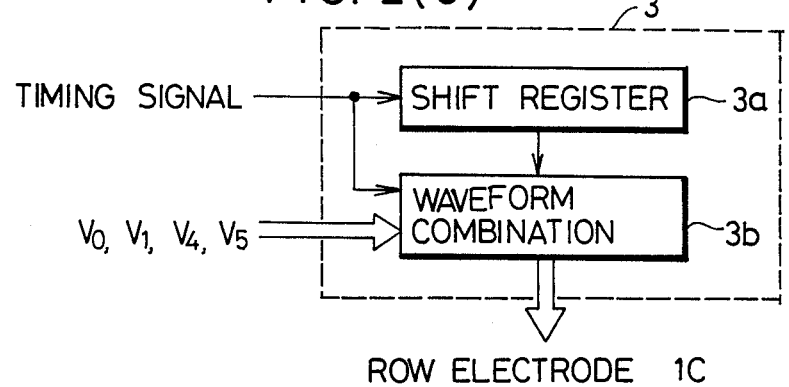
FIG. 2(c) is a block diagram of the row driver 3 shown in FIG. 2(a)
Figure 2D:
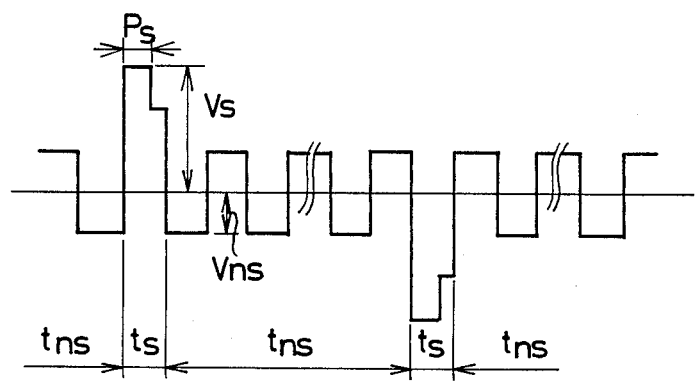
FIG. 2(d) is a diagram showing the waveform of the voltage applied between row and column electrodes.
Figure 3D:
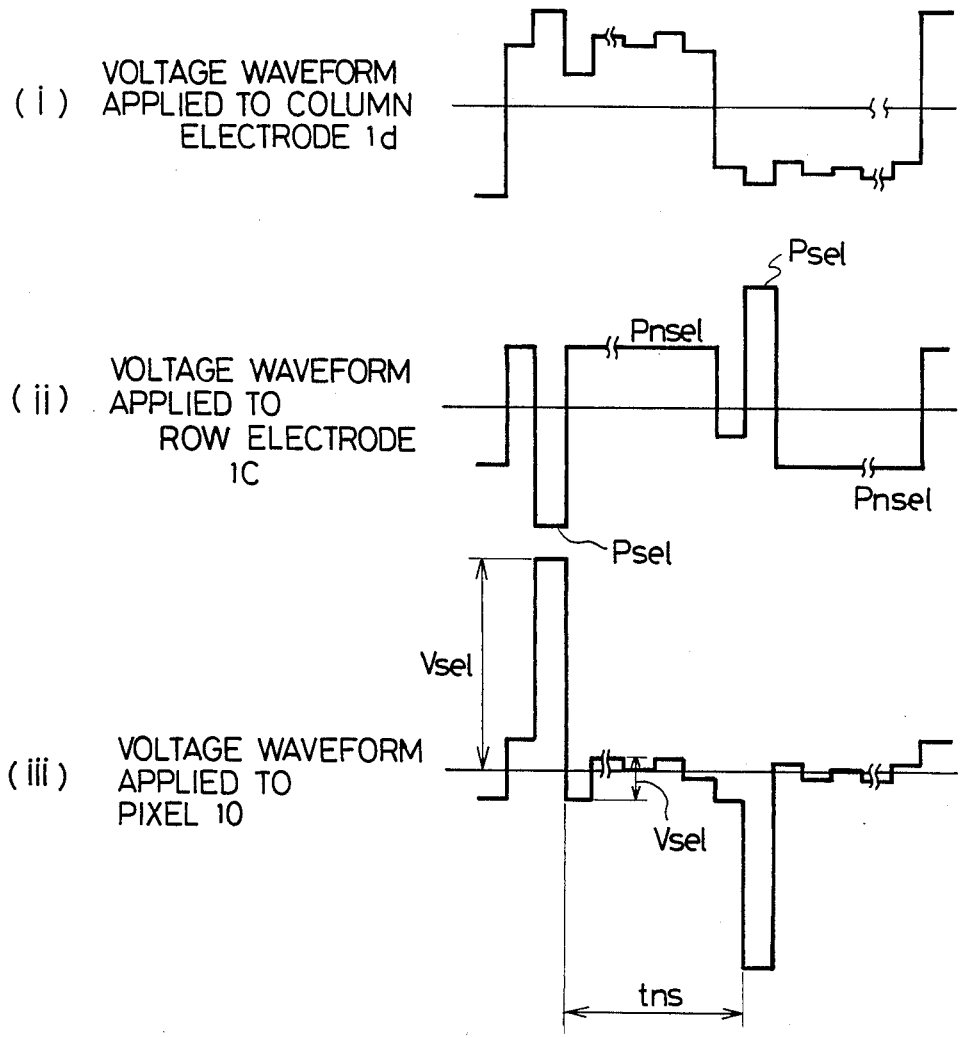
FIG. 3(d) is a diagram showing the waveform of the voltage applied to one picture element 10 shown in FIG. 3(a).
Figure 3A:
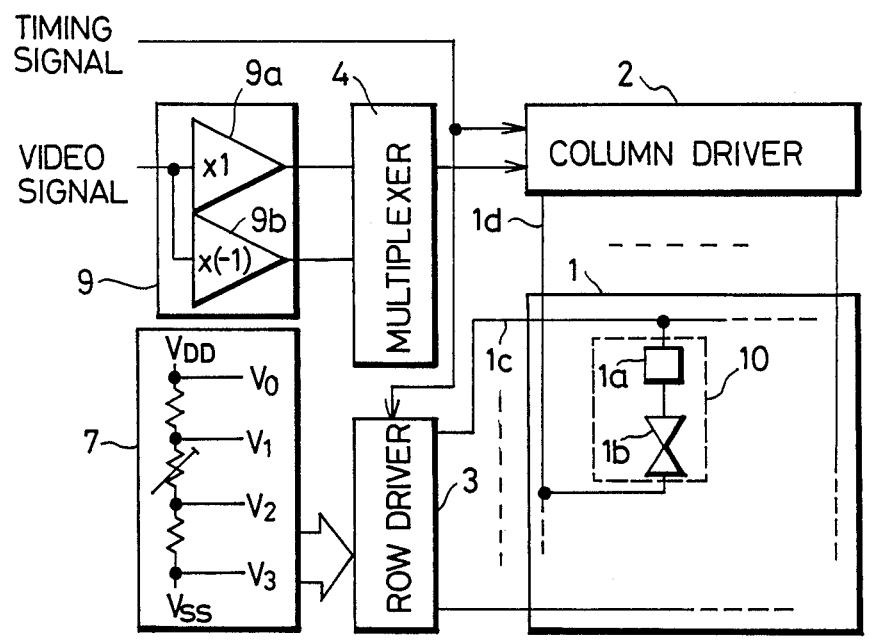
FIG. 3(a) is a block diagram of a display device utilizing amplitude modulation.
Figure 3B:
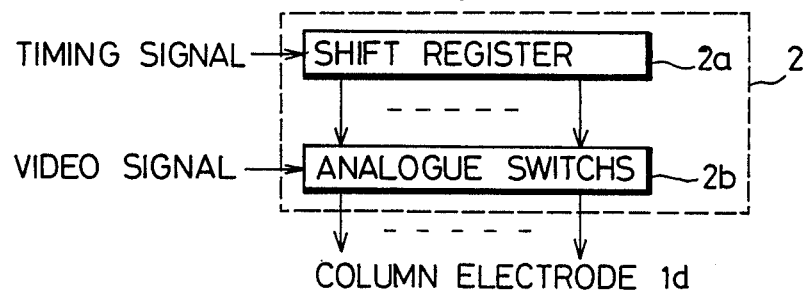
FIG. 3(b) is a block diagram of the row driver 2 shown in FIG. 3(a)
Figure 3C:
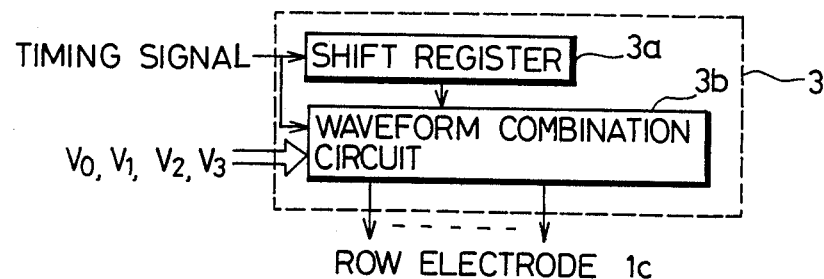
FIG. 3(c) is a block diagram of the row driver 3 shown in FIG. 3(a)

FIG. 1(a) is a block diagram of a nonlinear, two-terminal, active matrix display device according to the invention. FIG. 1(b) shows the waveform of voltages used to drive the device shown in FIG. 1(a). FIG. 1(c) is a circuit diagram of the row driver 3 shown in FIG. 1(a).

In the prior art device, the constant voltage delivered from the liquid crystal voltage source is used as a non-selecting signal applied to the row driver 3. In the inventive device, the non-selecting signal is made equal in phase and amplitude to the video signal applied to the column driver 2. The inventive device is similar to the prior art display device utilizing amplitude modulation except for the surroundings of the row driver 3 and so these similar portions will not be described below.

Referring to FIG. 1(a), video signals which are 180° out of phase with each other are fed to a row driver 3 after being amplified by amplifiers 5c and 5d included in a video amplifier circuit 5. The circuit of the row driver 3 is shown in FIG. 1(c). FIG. 1(d) is a time chart for illustrating the operation of the row driver 3, which consists of a shift register 3a and a waveform synthesizer circuit 3b. Timing signals are applied to the register 3a and the synthesizer circuit 3b. That is, clocks $S_{CL}$ are fed to the register 3a. Frame signal $S_{FR}$ is supplied to the synthesizer circuit 3b including analog switches 3c, 3d, 3e, 3f. The analog switches 3c and 3d are used to synthesize a selecting signal, while the switches 3e and 3f are employed to synthesize a non-selecting signal. The analog switches 3c and 3d transmit $V_{ss}$ to a selecting signal line $L_{sel}$ when the frame signal is at high level. They transmit $V_{DD}$ to the line when the frame signal $S_{FR}$ is at low level. These conditions are shown in the waveforms (ii) and (iii) of FIG. 1(d). When the frame signal $S_{FR}$ on the non-selecting signal line $L_{nsel}$ is at high level, the analog switches 3e and 3f allow the output from 5c to pass. When the frame signal $S_{FR}$ is at low level, they permit the output from 5d to pass. These conditions are shown in (iv) of FIG. 1(d). The selecting signal line $L_{sel}$ is connected with analog switches $3g_1$-$3g_n$, whereas the non-selecting signal line $L_{nsel}$ is tied with analog switches $3h_1$14 $3h_n$.

The output signals $Q_1$-$Q_n$ from the shift register successively assume high condition to selectively open or close the analog switches $3g_1$-$3g_n$ and $3h_1$-$3h_n$. When the output $Q_1$ (i=1 to n) of the shift register goes high, the signal on the selecting signal line $L_{sel}$ is fed to the corresponding row electrode 1c via $3g_i$. When $Q_i$ goes low, the signal on the non-selecting signal line $L_{nsel}$ is fed to the row electrode 1c via $3h_i$. The waveform (vi) of FIG. 1(d) shows the voltage applied to the row electrode 1c in response to the output $Q_2$ from the shift register. During period A in which $Q_2$ is at a high level, a signal corresponding to the waveform (ii) of FIG. 1(d) is delivered. During period B in which $Q_2$ is at a low level, a signal corresponding to the waveform (iv) shown in FIG. 1(d) is delivered. During the period A, a voltage is applied to one picture element 10 of the display device 1 and so this period is a selecting period. During the period B, no voltage is applied to any picture element 10 and so this period is a non-selecting period.

The waveforms of voltages applied to the row electrodes 1c, the column electrodes 1d, and the picture elements 10 are next described by referring to FIG. 1(b). Waveform (i) of FIG. 1(b) is a video signal which is sampled and held by the column driver 2 and fed to one column electrode 1d. The polarity of the signal is inverted on every frame to drive the liquid crystal with alternating current.

Waveform (ii) of FIG. 1(b) is a signal which is supplied to one row electrode 1c by the row driver 3. This signal is equal in potential and phase to the video signal which can be either the selecting signal $P_{sel}$ or the non-selecting signal $P_{nsel}$ delivered to one column electrode 1d. The signal $P_{sel}$ has a constant voltage $V_{DD}$ or $V_{SS}$.

Waveform (iii) of FIG. 1(b) shows the voltage applied to the picture element 10 that is the intersection of one column electrode 1d and one row electrode 1c. This waveform is the difference between the waveform (i) of the signal applied to the column electrode 1d and the waveform (ii) of the signal applied to the row electrode 1c. As can be seen from the diagram, during each non-selecting period, the signals applied to the column electrode 1d and the row electrode 1c are equal in phase and amplitude. Therefore, the potential difference appearing at the picture element is null. As a result, during the non-selecting period, the nonlinear two-terminal device 1a included in the picture element 10 is maintained at a high resistance. Consequently, the amount of electric charge which was written to the equivalent capacitance of the liquid-crystal layer 1b or erased during the selecting period can be maintained. This permits removal of the effects of the voltage applied to the column electrode on each picture element, i.e., crosstalk.

In this way, during each selecting period, the liquid-crystal layer 1b is charged to the potential of the video signal or discharged via the nonlinear, two-terminal device 1a whose resistance is rendered sufficiently low. During each non-selecting period, the potential across the liquid-crystal layer is retained by the device 1a which has a sufficiently high resistance.

As described above, the novel active matrix display device of the nonlinear, two-terminal type uses a simple and inexpensive driver circuit to display images or characters of high image quality without producing crosstalk. Of course, the invention is applicable to a display making use of a two-valued variable, i.e., amplitude modulation as well as to one that displays, i.e., pulse-duration modulation gradation.

We claim:

1. An active matrix display device operative according to a video signal, comprising:
 a group of column electrodes and another group of row electrodes which intersect with the column electrodes to define intersections therebetween;
 a plurality of matrix picture elements disposed at the respective intersections, each matrix picture element including a nonlinear switching device having two terminals and liquid crystal connected in series to the nonlinear switching device between the corresponding column and row electrodes;
 column drive means for applying to the group of the column electrodes a column drive signal having phase and amplitude determined according to the video signal; and
 row drive means operative to sequentially select the row electrodes for applying to the selected row electrode a first row drive signal different from the column drive signal and effective to turn on the nonlinear switching device of a picture element on the selected row electrode to thereby drive the picture element according to the column drive signal and for applying to the non-selected row electrodes a second row drive signal having phase and amplitude the same as those of the column drive signal and effective to substantially avoid the application of voltage to picture elements on the non-selected row electrodes.

2. An active matrix display device according to claim 1; wherein the row drive means includes a plurality of switching means connected to the respective row electrodes for switching between the first and second row drive signals.

3. An active matrix display device according to claim 2; wherein the row drive means includes a shift register for sequentially selecting the plurality of switching means to operate the same.

4. An active matrix display device of the nonlinear, two-terminal type comprising:
   a plurality of column electrodes, and a plurality of row electrodes spaced from and intersecting the column electrodes to define intersections therebetween;
   a matrix of picture elements disposed at the respective intersections, each picture element comprising a nonlinear, two-terminal switching device, and a liquid crystal layer connected in series with the switching device between the corresponding intersecting column and row electrodes and operative when driven to undergo charging or discharging;
   column driving means for driving the column electrodes with a video signal having a given phase and magnitude; and
   row driving means for sequentially driving the row electrodes with a selecting signal having a phase and magnitude different from those of the video signal and effective to enable the liquid crystal layer of the selected picture elements to be charged or discharged and for driving the row electrodes with a non-selecting signal having the same phase and magnitude as those of the video signal and effective to prevent the liquid crystal layer of the non-selected picture elements from being discharged or charged.

5. An active matrix display device according to claim 4; wherein said column driving means includes a multiplexer for multiplexing video signals, and a video amplifier circuit for amplifying the video signals.

6. An active matrix display device according to claim 4; wherein said row driving means includes a shift register, analog switches and an amplifier circuit.

7. A method of driving a picture element composed of electro-optic material interposed between a row electrode and a column electrode, the method comprising the steps of:
   generating a video signal having a given phase and magnitude;
   producing a selecting signal having a phase and magnitude different from those of the video signal;
   producing a non-selecting signal having a phase and magnitude the same as those of video signal; and
   selectively applying the selecting signal to the row electrode while applying the video signal to the column electrode to thereby drive the picture element according to the video signal and otherwise applying the non-selecting signal to the row electrode while applying the video signal to the column electrode to thereby effectively prevent application of voltage to the picture element.

8. A method of driving an active matrix display device according to claim 7; wherein the driving step is carried out using amplitude modulation.

9. A method of driving an active matrix display device according to claim 7; using pulse-duration modulation.

* * * * *